United States Patent
Song et al.

(10) Patent No.: US 8,858,331 B2
(45) Date of Patent: Oct. 14, 2014

(54) MULTIPLAYER SOCIAL EXERCISE GAME METHOD AND SYSTEM WITH VARIOUS TYPES OF EXERCISES OR EQUIPMENTS

(75) Inventors: June-Hwa Song, Daejeon (KR); Tai-Woo Park, Daejeon (KR); Soun-Eil Park, Daejeon (KR); Chung-Kuk Yoo, Daejeon (KR); Byung-Lim Park, Daejeon (KR)

(73) Assignee: Korea Advanced Institute of Science and Technology, Daejeon (KR)

( * ) Notice: Subject to any disclaimer, the term of this patent is extended or adjusted under 35 U.S.C. 154(b) by 414 days.

(21) Appl. No.: 13/324,542

(22) Filed: Dec. 13, 2011

(65) Prior Publication Data

US 2012/0190416 A1     Jul. 26, 2012

(30) Foreign Application Priority Data

Jan. 20, 2011 (KR) ........................ 10-2011-0005916

(51) Int. Cl.
*A63F 13/00* (2014.01)
*A63F 13/30* (2014.01)
*H04L 29/06* (2006.01)

(52) U.S. Cl.
CPC ............... *H04L 67/38* (2013.01); *A63F 13/12* (2013.01); *A63F 2300/535* (2013.01); *A63F 2300/8005* (2013.01); *A63F 2300/1062* (2013.01); *A63B 2225/50* (2013.01)
USPC .................... 463/36; 463/39; 463/40; 463/42

(58) Field of Classification Search
USPC ......................................... 463/36, 39, 40, 42
See application file for complete search history.

(56) References Cited

U.S. PATENT DOCUMENTS

| | | | | |
|---|---|---|---|---|
| 5,645,513 | A * | 7/1997 | Haydocy et al. | 482/57 |
| 5,667,459 | A * | 9/1997 | Su | 482/4 |
| 5,947,868 | A * | 9/1999 | Dugan | 482/4 |
| 6,095,949 | A * | 8/2000 | Arai | 482/4 |
| 6,283,896 | B1 * | 9/2001 | Grunfeld et al. | 482/54 |
| 6,716,106 | B2 * | 4/2004 | Wang et al. | 472/59 |
| 6,852,069 | B2 * | 2/2005 | Park | 482/8 |
| 7,037,241 | B2 * | 5/2006 | Kuo | 482/51 |
| 8,152,640 | B2 * | 4/2012 | Shirakawa et al. | 463/36 |
| 8,506,458 | B2 * | 8/2013 | Dugan | 482/57 |
| 8,574,080 | B2 * | 11/2013 | Yamazaki et al. | 463/39 |
| 8,612,247 | B2 * | 12/2013 | Sawano et al. | 705/2 |
| 8,654,073 | B2 * | 2/2014 | Konishi | 345/156 |

(Continued)

OTHER PUBLICATIONS

Ahn et al. "Swan Boat: Pervasive Social Game to Enhance Treadmill Running", MM'09, Oct. 19, 2009 p. 1-2.*

*Primary Examiner* — William M Brewster
*Assistant Examiner* — Ryan Hsu

(57) ABSTRACT

An exercise game system of the present invention includes a plurality of game clients and a game server. The game clients transmit over a network, exercise intensity information in which exercise intensities of the players performing various types of exercises are measured. The game server drives an exercise game by receiving exercise intensity information of the respective players from the game clients over the network, and by determining a motion of a game object to be displayed on a game screen based on exercise intensity information that is balanced according to a predetermined balancing rule about at least one element of exercise intensity, a change rate, and a duration time according to different types of exercises. In this instance, the game screen is represented to be capable of recognizing the motion of the game object that is affected by adjusting the intensity of exercise performed by the players.

12 Claims, 4 Drawing Sheets

(56) References Cited

U.S. PATENT DOCUMENTS

| | | | |
|---|---|---|---|
| 2003/0064860 A1* | 4/2003 | Yamashita et al. | 482/8 |
| 2004/0180719 A1* | 9/2004 | Feldman et al. | 463/36 |
| 2009/0233769 A1* | 9/2009 | Pryor | 482/8 |

* cited by examiner

MULTIPLAYER SOCIAL EXERCISE GAME METHOD AND SYSTEM WITH VARIOUS TYPES OF EXERCISES OR EQUIPMENTS

CROSS-REFERENCE TO RELATED APPLICATIONS

This application claims priority under 35 U.S.C. §119 to Korean Patent Application No. 10-2011-0005916, filed on Jan. 20, 2011, in the Korean Intellectual Property Office, the disclosure of which is incorporated herein by reference in its entirety.

TECHNICAL FIELD

The present invention relates to a game system, and more particularly, to a system in which a game and an exercise are combined with each other and a game driving method thereof

BACKGROUND

Most people know that steady exercise is necessary in order to maintain good health condition; however, few of them can afford enough exercise due to various reasons. Fitness centers for providing place for exercise and various exercise equipment are popularized, and personal exercise equipment enabling people to exercise without restriction on time and place has come into wide use.

Despite such efforts, it is still hard for the people to exercise with steadiness. There are two major reasons why people do not exercise consistently.

First, people do not find exercising to be fun. Many exercises include monotonous repeating motions and thus, people do not feel tensed and lose their interest easily.

Second, when people exercise individually, their motivation might become weak. Thus, he or she may easily give up the exercise and as a result, there overall endurance is not achieved.

When comparing individual exercises at a fitness center to a group sport such as soccer, the above problem becomes further outstanding. The exercises at the fitness center are repetitive and can easily un-motivate an individual depending on the individual. On the other hand, in the case of soccer, people need to cope with various circumstances aggressively due to characteristics of a group game and thus, can maintain tension while playing soccer. Also, while doing their best for their own roles for the same goal of the same team, people barely give up exercise.

However, due to constraints on time and occasion, a group sport such as soccer cannot be played at any time and thus, most people choose to exercise alone at fitness centers or homes.

Also, since a suitable exercise or a preferred exercise is different for each person, there is a need to consider various exercising methods that can achieve the same effect as group exercise while each person performs an individual exercise. At the same time, even if people perform various types of exercises or use different types of exercise equipment, the exercise game system should be designed to be fair, which means that players who participate in a multiplayer exercise game do not feel too difficult to achieve a game goal, or in contrast, feel too easy to lose their interest due to the differences on the physical capability or the equipments.

SUMMARY

An exemplary embodiment of the present invention provides an exercise game system, including: a plurality of game clients to transmit, over a network, exercise intensity information in which exercise intensities of a plurality of players performing various types of exercises are measured; and a game server to drive an exercise game by receiving exercise intensity information of the respective players from the game clients over the network, and by determining a motion of a game object to be displayed on a game screen based on exercise intensity information that is balanced according to a predetermined balancing rule about at least one element of exercise intensity, a change rate, and a duration time according to different types of exercises.

The game screen may be represented to be capable of recognizing the motion of the game object that is affected by adjusting the intensity of exercise performed by the players.

The game server may operate to drive a mathematical model, pre-produced with respect to the game object, based on the balanced exercise intensity information, and to thereby determine the motion of the game object.

The mathematical model may be a model that is produced based on a physical characteristic of the game object to be capable of determining the motion of the game object.

The various types of exercises may include any one of exercise using at least one of a running machine, a rowing machine, a heath bicycle, a stepper, a swing stepper, a jump rope, and a hula hoop, stretching exercise in a state of wearing a tool capable of measuring a heart rate or a frequency, or weight training, and a combination thereof.

The game server may operate to provide the balanced exercise intensity information by normalizing the exercise intensity information to the same scale using a difference between the minimum exercise intensity and the maximum exercise intensity that are empirically obtained according to the different types of exercises with respect to the balancing rule of the exercise intensity.

The balanced exercise intensity information may be defined as $v_{obj} = \alpha \times (v_{ex} - v_{ex\_min})$. Here, $v_{obj}$ may denote the balanced exercise intensity information, $v_{ex}$ may denote received current exercise intensity information, $\alpha$ may be defined as $v_{obj\_max}/(v_{ex\_vig} - v_{ex\_min})$, $v_{obj\_max}$ may denote the maximum speed of the game object, $v_{ex\_vig}$ may denote the maximum exercise intensity of a corresponding exercise, and $v_{ex\_min}$ may denote the minimum exercise intensity.

The game server may operate to provide the balanced exercise intensity information by normalizing a temporal change rate of the exercise intensity information to the same scale using the maximum value, the minimum value, or the average value of exercise intensity change rates that are empirically obtained according to the different types of exercises with respect to the balancing rule of the change rate, and by reflecting a normalized change rate to the exercise intensity information.

The balanced exercise intensity change rate may be defined as $a_{obj} = \beta \times a_{ex}$. Here, $a_{obj}$ may denote the balanced exercise intensity change rate, $a_{ex}$ may denote a current exercise intensity change rate, $\beta$ may be defined as $a_{tgt}/a_{ex\_max}$, $a_{tgt}$ may denote a target acceleration of the game object, and $a_{ex\_max}$ may denote the maximum exercise intensity change rate of a corresponding exercise.

The game server may operate to accumulate the excessive quantity of exercise according to the different types of exercises and thereby provide balanced exercise intensity information for driving the game object, instead of providing exercise intensity information in response to a player exercising, temporarily during a period of time corresponding to the accumulated excessive quantity of exercise when the player selects a mode, with respect to the balancing rule of the duration time.

The excessive quantity of exercise may correspond to excessive metabolic equivalents of task (MET) that relatively exceeds compared to the smallest MET among METs that are empirically obtained according to the different types of exercises.

When a player having accumulated the excessive quantity of exercise to be greater than or equal to a predetermined value selects a cruise control mode, the game server may operate to provide at least one of exercise intensity information of when entering into the cruise control mode, predetermined exercise intensity information, and exercise intensity information designated by the player, instead of providing exercise intensity information in response to the player exercising.

The game server may operate to provide the balanced exercise intensity information by normalizing the exercise intensity information to the same scale using a difference between the minimum exercise intensity and the maximum exercise intensity that are empirically obtained according to the different types of exercises with respect to the balancing rule of the exercise intensity, and to temporarily decrease a value of the maximum exercise intensity with respect to the balancing rule of the duration time.

Another exemplary embodiment of the present invention provides a game server, including: a network interface to receive, over a network, exercise intensity information in which exercise intensities of a plurality of players performing various types of exercises are measured; a balancing unit to generate balanced exercise intensity information according to a predetermined balancing rule about at least one element of exercise intensity, a change rate, and a duration time according to different types of exercises; a mathematical modeling unit to determine a motion of a game object to be displayed on a game screen based on the balanced exercise intensity information; and a game processing unit to configure the game screen according to the determined motion of the game object.

Yet another exemplary embodiment of the present invention provides a method of driving an exercise game, including: receiving, over a network, exercise intensity information in which exercise intensities of a plurality of players performing various types of exercises are measured; balancing the exercise intensity information according to a predetermined balancing rule about at least one element of exercise intensity, a change rate, and a duration time according to different types of exercises; determining a motion of a game object to be displayed on a game screen based on the balanced exercise intensity information; and generating the game screen by reflecting the determined motion of the game object.

The game screen may be represented to be capable of recognizing the motion of the game object that is affected by adjusting the intensity of exercise performed by the players.

The balancing rule of the exercise intensity may be a rule to provide the balanced exercise intensity information by normalizing the exercise intensity information to the same scale using a difference between the minimum exercise intensity and the maximum exercise intensity that are empirically obtained according to the different types of exercises.

The balancing rule of the change rate may be a rule to provide the balanced exercise intensity information by normalizing a temporal change rate of the exercise intensity information to the same scale using the maximum value, the minimum value, or the average value of exercise intensity change rates that are empirically obtained according to the different types of exercises, and by reflecting the normalized exercise intensity change rate to the exercise intensity information.

The balancing rule of the duration time may be a rule to accumulate the excessive quantity of exercise according to the different types of exercises and thereby provide balanced exercise intensity information for driving the game object, instead of providing exercise intensity information in response to a player exercising, temporarily during a period of time corresponding to the accumulated excessive quantity of exercise when the player selects a mode.

The balancing rule of the exercise intensity may be a rule to provide the balanced exercise intensity information by normalizing the exercise intensity information to the same scale using a difference between the minimum exercise intensity and the maximum exercise intensity that are empirically obtained according to the different types of exercises.

The balancing rule of the duration time may be a rule to temporarily decrease a value of the maximum exercise intensity.

Still another exemplary embodiment of the present invention provides a method of driving an exercise game, including: receiving, over a network, exercise intensity information in which exercise intensities of a plurality of players performing various types of exercises are measured; normalizing the exercise intensity information to the same scale using a difference between the minimum exercise intensity and the maximum exercise intensity that are empirically obtained according to the different types of exercises; providing the balanced exercise intensity information by normalizing a temporal change rate of the exercise intensity information to the same scale using the maximum value, the minimum value, or the average value of exercise intensity change rates that are empirically obtained according to the different types of exercises, and by reflecting the normalized exercise intensity change rate to the normalized exercise intensity information; accumulating the excessive quantity of exercise according to the different types of exercises to thereby provide balanced exercise intensity information for driving the game object, instead of providing exercise intensity information in response to a player exercising, temporarily during a period of time corresponding to the accumulated excessive quantity of exercise when the player selects a mode; determining a motion of a game object to be displayed on a game screen based on the balanced exercise intensity information; and generating the game screen by reflecting the determined motion of the game object.

The game screen may be represented to be capable of recognizing the motion of the game object that is affected by adjusting the intensity of exercise performed by the players.

Still yet another exemplary embodiment of the present invention provides recording media storing a program to implement the exercise game driving method according to various exemplary embodiments in a computer.

Other features and aspects will be apparent from the following detailed description, the drawings, and the claims.

DETAILED DESCRIPTION OF EMBODIMENTS

Figure 1:
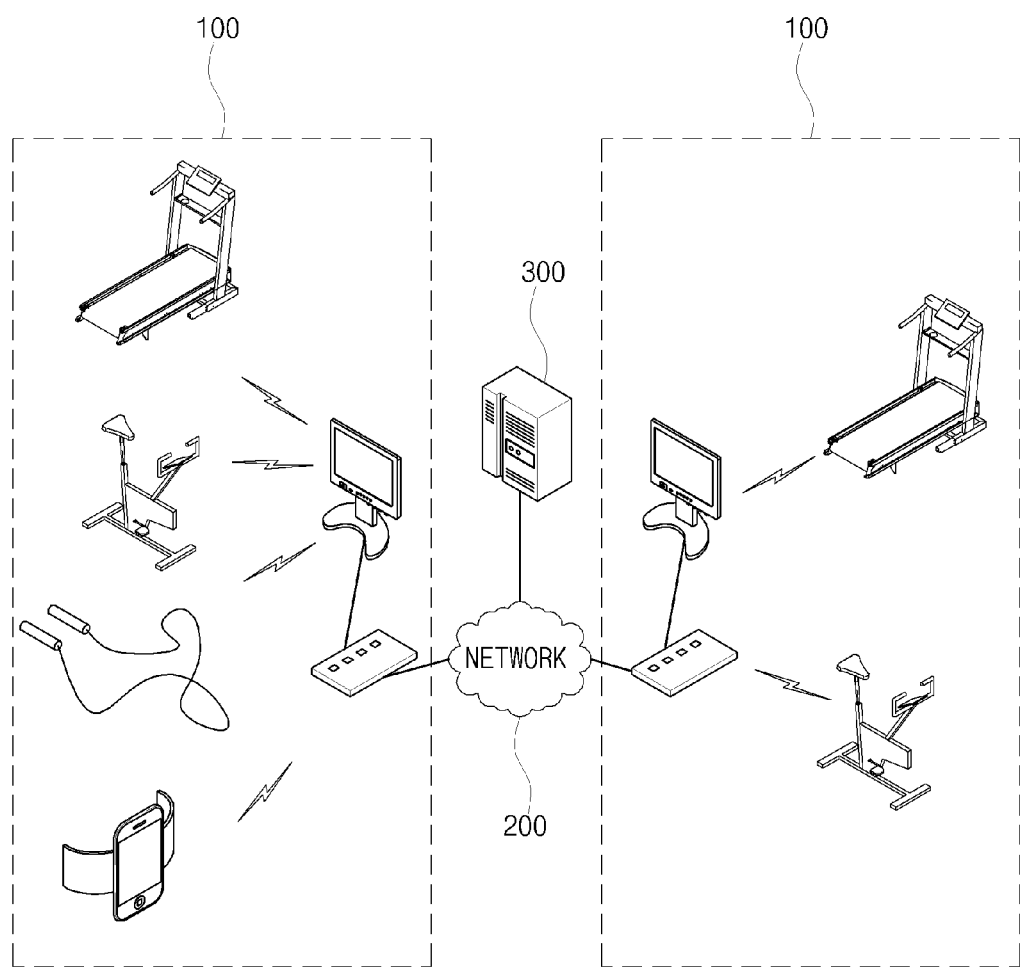
FIG. 1 is an exemplary conceptual diagram illustrating a multiplayer exercise game system according to an exemplary embodiment of the present invention.

Hereinafter, exemplary embodiments will be described in detail with reference to the accompanying drawings. Throughout the drawings and the detailed description, unless otherwise described, the same drawing reference numerals will be understood to refer to the same elements, features, and structures. The relative size and depiction of these elements may be exaggerated for clarity, illustration, and convenience. The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

FIG. 1 is an exemplary conceptual diagram illustrating a multiplayer exercise game system according to an exemplary embodiment of the present invention.

Referring to FIG. 1, an exercise game system 10 is a platform that is provided with exercise equipment 100 required by a plurality of players, respectively, and enables the plurality of players to participate in an exercise game operated by a game server 300 over a network 200 such as Internet.

In the exemplary embodiment of the present invention, a plurality of players move a game object to achieve a desired goal through mutual cooperation or competition, in which a physical change of the game object is determined according to intensity of exercise. Each player affects the physical change of the game object, for example, a speed, a movement direction, a rotation, and the like by adjusting the exercise intensity, while each player is exercising.

To this end, each of the exercise equipment 100 may include a sensor and a game client in a body.

The exercise equipment 100 may include any kind of equipment as long as the equipment is exercise equipment capable of measuring exercise intensity of a player as a speed, a distance, a height, a frequency, and the number of revolutions, such as a running machine (treadmill), a stationary bicycle, a rowing machine, a stepper, a jump rope, a hula hoop, and the like, exercise equipment capable of measuring the quantity of exercise as consumed calories, metabolic equivalents of task (MET), a heart rate, and the like, or auxiliary exercise equipment capable of measuring a frequency when performing stretching exercise, such as push-ups, sit-ups, and the like, or dumbbell exercise.

The exercise intensity of the player may be measured based on information collected by a sensor, for example, a driving speed of a running machine belt, a rotation speed of pedals of a stationary bicycle, revolutions per minute of a jump rope, and revolutions per minute of a hula hoop.

Exercise intensity information measured by the sensor of the exercise equipment 100 is transmitted to the game client having various types of wired and wireless network interfaces. The game client transmits the exercise intensity information to the game server 300 over the network 200 such as Internet.

The game server 300 may drive a mathematical model capable of physically simulating game objects within an exercise game of which motions are determined based on exercise intensities of players.

In this instance, the game server 300 may balance exercise intensity information, collected in relation to each of the players, to decrease a difference between different exercises and a difference between different types of exercise equipment, and may drive the mathematical model based on the balanced exercise intensity information.

With respect to each game object, a speed, a movement direction, and acceleration may be adjusted based on the exercise intensity of at least one player. For example, modeling may be performed such that the game object may be moved by two driving force vectors positioned on both sides of the centroid. Exercise intensities of two players may be mapped to magnitudes of the driving force vectors, respectively.

Exercises that the respective players perform have different exercise intensities and characteristics. For example, in the case of a jump roping exercise, revolutions per minute (rpm) are relatively high and it is easy to control the number of revolutions. However, there are tendencies in that MET is large, it is difficult to perform a jump roping exercise for a long time, and a time duration in which a player can continue the exercise without making a mistake is short. In the case of a hula hooping exercise, revolutions per minute are relatively low and it is tricky to control the number of revolutions. However, due to a small MET, it is possible to perform the exercise for a long time and a probability of making a mistake is low. In the case of a running machine exercise, it is difficult to control a detail speed and MET is large, however, it is possible to continuously maintain the exercise intensity. In the case of a bicycle exercise, it is easy to control a detail speed, MET is relatively small, and it is possible to maintain the exercise intensity for a long time.

As a result of observing a characteristic of each of exercises, the inventor discovered that it is possible to decrease a difference between exercises, and to maximize the effect of exercise by balancing exercise intensities in three aspects, that is, the intensity of exercise, a change rate of the exercise intensity, and a duration time.

Balancing of the exercise intensity, the change rate, and the duration time will be further described in detail with reference to a flowchart of FIG. 3.

The game server 300 may generate game data from a mathematical model that is driven based on the balanced exercise intensity information, such that an exercise game may be displayed on a screen for players, and may display the game data on a display for each of the players.

The players may be immersed in the exercise game by viewing the exercise game screen displayed on the display and recognizing a physical change in a game object according to their own exercise intensity.

Figure 2:
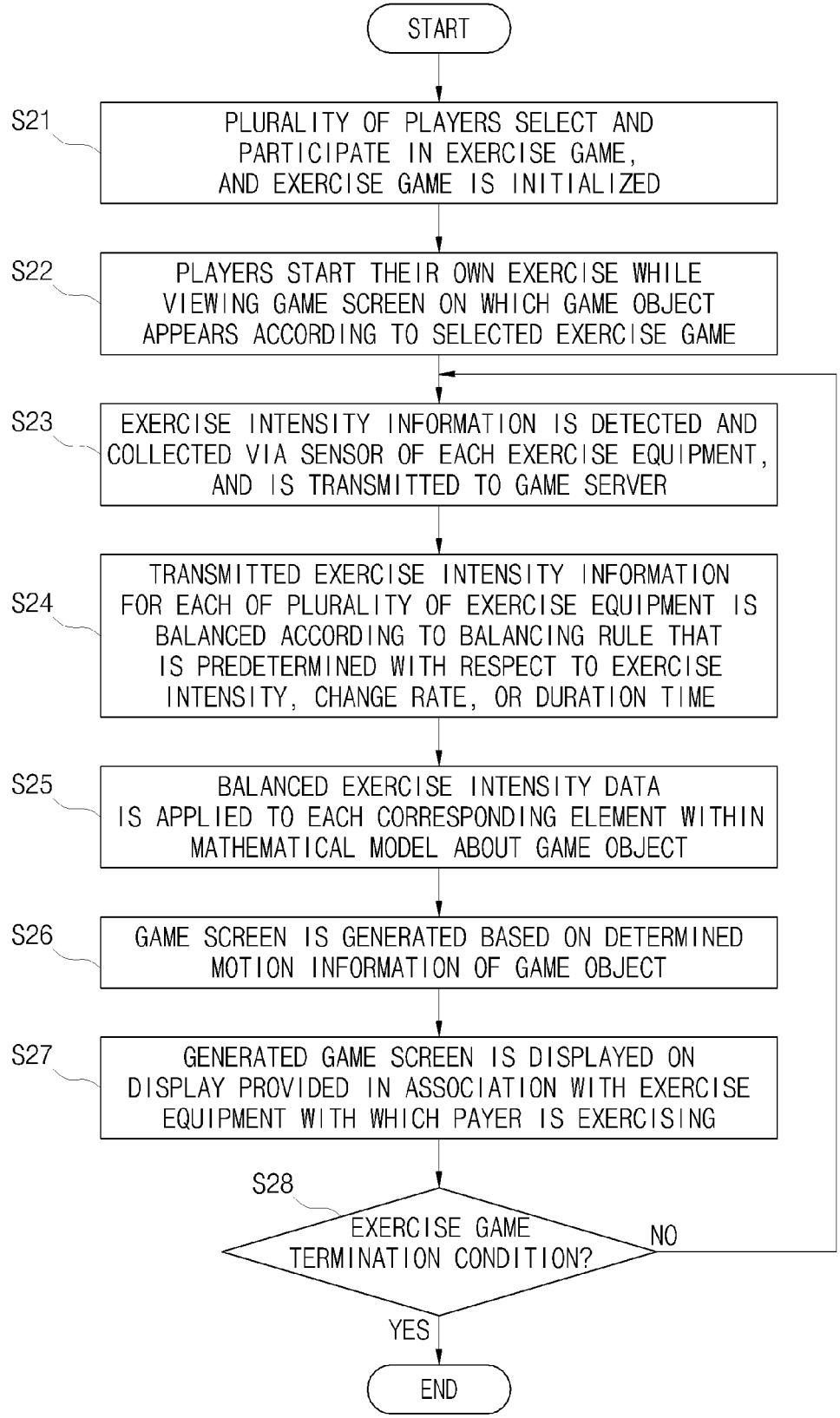
FIG. 2 is an exemplary flowchart illustrating a multiplayer exercise game method according to an exemplary embodiment of the present invention.

FIG. 2 is an exemplary flowchart illustrating a multiplayer exercise game method according to an exemplary embodiment of the present invention.

Referring to FIG. 2, according to the multiplayer exercise game method, a plurality of players select an exercise game and participate in the selected exercise game, and the exercise game is initialized, in step S21 Specifically, a process of registering the exercise equipment 100 of each player to the selected exercise game, a process of suggesting suitable exercise games according to the exercise equipment 100 and selecting the exercise game, a process of selecting, by players, a team, a process of matching exercise intensity information to be transferred from each exercise equipment 100 to the game server 300 with an element within a mathematical model indicating a game object of the selected exercise game, a process of selecting, by players, the goal of game or a difficulty level, a process of indicating a notice or a warning, and the like, may be performed.

In step S22, the players start their own exercise while viewing the game screen on which the game object appears according to the selected exercise game.

In step S23, exercise intensity information is detected and collected via a sensor of each exercise equipment, and is transmitted to the game server 300 over a network interface of a game client and the network 200.

In step S24, the transmitted exercise intensity information for each of a plurality of exercise equipment is balanced according to a balancing rule that is predetermined with respect to exercise intensity, a change rate, or a duration time.

The balancing rule will be described in detail with reference to FIG. 3.

In step S25, the balanced exercise intensity information is applied to each corresponding element within the mathematical model about the game object. When the mathematical model operates, motion information of the game object may be determined.

In step S26, a game screen is generated based on the determined motion information of the game object.

In step S27, the generated game screen is displayed on the display that is provided in association with exercise equipment with which the payer is exercising. The exercise intensity of the player is immediately reflected in a motion of the game object appearing on the game screen displayed on the display. The player may recognize the motion of the game object and adjust the player's exercise intensity.

In step S28, the game server 300 determines whether the exercise game is terminated. For example, the game may be terminated once the goal is achieved, a failure is confirmed due to other circumstances where it is impossible to achieve the goal, or the player stops exercising, and the like.

When the exercise game is not terminated in step S28, the process returns to step S23 and steps from step S23 to step S27 are repeated.

When the exercise game is terminated in step S28, the game server 300 performs a game termination procedure. For example, the game termination procedure may include a procedure of displaying a game result on the display so that the player may select a subsequent progress, recording the game result in an account of the player, guiding the player to safely suspend the exercise equipment, and the like.

As described above, the multiplayer exercise game method of the exemplary embodiment of the present invention enables a plurality of players who participate in a game to make a team using their own exercise equipment and thereby exercise in cooperation with each other or in competition with another team, and to move the game object displayed on the game screen, thereby increasing the effect of exercise and enjoying the exercise.

Figure 3:
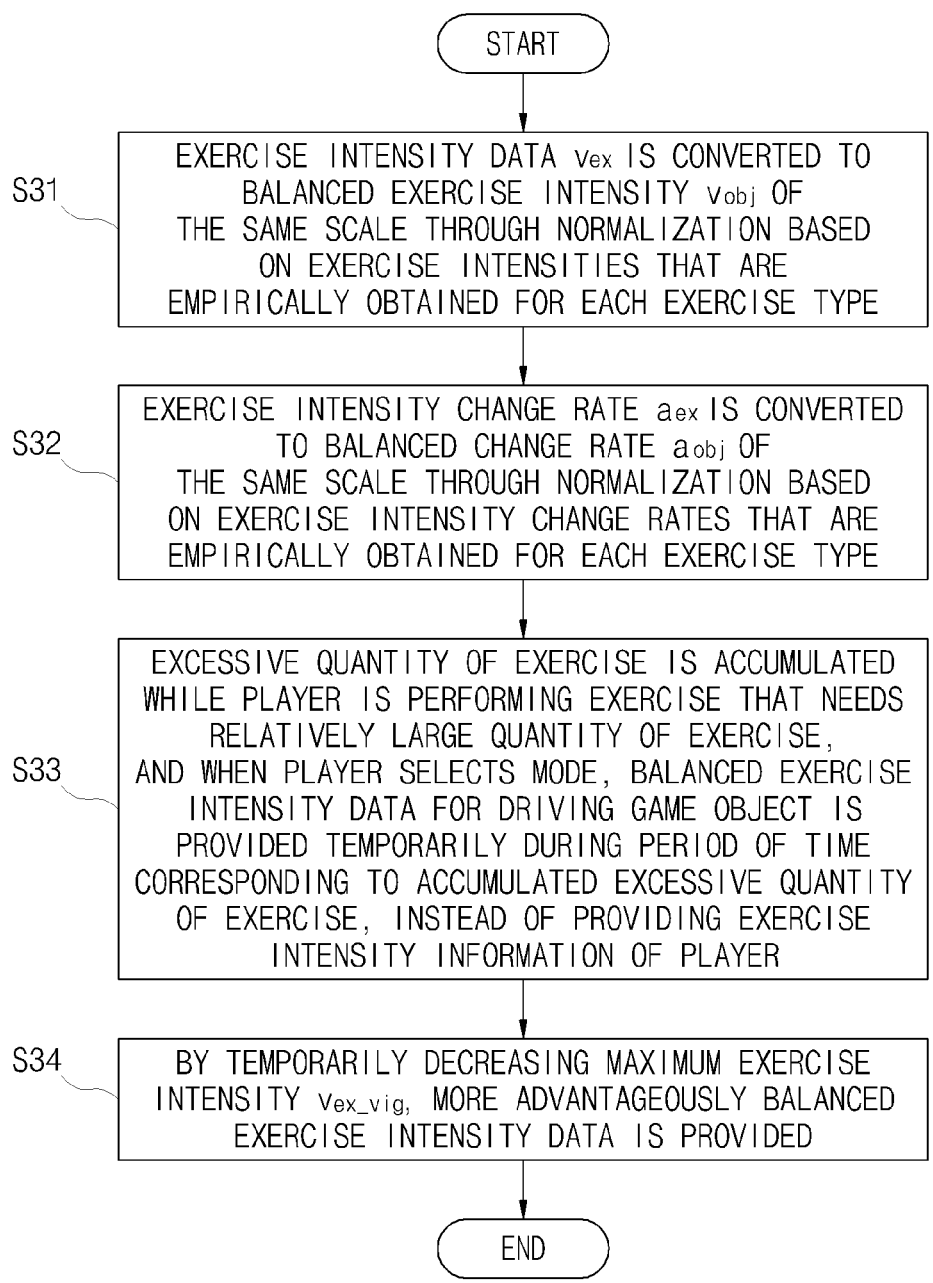
FIG. 3 is an exemplary flowchart illustrating a balancing step in a multiplayer exercise game method according to an exemplary embodiment of the present invention.

FIG. 3 is an exemplary flowchart illustrating a balancing step in a multiplayer exercise game method according to an exemplary embodiment of the present invention.

Referring to FIG. 3, in step S31 for balancing nonequivalent(unequal?) exercise intensity according to an exercise type, transferred exercise intensity information $V_{ex}$ for each exercise equipment, for example, revolutions per minute (rpm) of a jump rope, revolutions per minute (rpm) of a hula hoop, a belt driving speed (kph) of a running machine, and revolutions per minute (rpm) of pedals of a stationary cycle, is converted to balanced exercise intensity $v_{obj}$ of the same scale through normalization based on exercise intensities that are empirically obtained for each exercise type as shown in Table 1. The exercise intensity $v_{obj}$ may be directly associated with a speed of a game object.

The balancing rule for balancing each exercise equipment may be determined as follows: In every exercise, a player may exhibit the maximum intensity within a short time and may maintain an exercise status with the minimum load for a long time. Such tendency may be associated with the maximum and the minimum of a physical element of the game object.

If the player substantially suspends the game object when the player exercises with the minimum exercise intensity for maintaining the exercise status (for example, slowly hula hooping only at a level of not dropping a hula hoop), and moves the game object at the maximum speed when the player exercises with the maximum exercise intensity that the player can exhibit (for example, hula hooping at the maximum level of the player), it is possible to normalize the exercise intensity exceeding the minimum exercise intensity, regardless of the type of exercise, and to directly match exercise intensities of different exercises with each other.

Accordingly, using coefficient $\alpha$ that is predetermined as shown in Table 1 in correspondence to a ratio of a difference $(v_{ex\_vig}-v_{ex\_min})$ between the maximum exercise intensity and the minimum exercise intensity of a corresponding exercise to the maximum speed $(v_{obj\_max})$ of the game object, exercise intensity information $v_{ex}$ may be linearly converted to the balanced exercise intensity $v_{obj}$ for the game object, for example, like $v_{obj}=\alpha \times (v_{ex}-v_{ex\_min})$.

TABLE 1

|  | Jump rope | Hula hoop | Running machine | Stationary bicycle |
|---|---|---|---|---|
| $V_{ex\ vie}$ | 161 rpm | 79 rpm | 15 kph | 112 rpm |
| $V_{ex\ min}$ | 98 rpm | 59 rpm | 3.2 kph | 25 rpm |
| $\alpha$ | 5.1 pixel/rpm | 1.6 pixel/rpm | 8.5 pixel/kph | 1.2 pixel/rpm |

Through this, players performing different types of exercises, for example, a hula hooping exercise and a running machine exercise, may fairly cooperate with each other or compete with each other in at least a speed aspect.

In step S32 for balancing a nonequivalent change rate for each exercise type, exercise intensity change rate $a_{ex}$ is converted to balanced change rate $a_{obj}$ of the same scale through normalization based on exercise intensity change rates that are empirically obtained for each exercise type as shown in Table 2. The change rate $a_{obj}$ may be directly associated with the acceleration of the game object.

The balancing rule for balancing each exercise equipment may be determined as follows. According to types of exercises, as shown in Table 2, there is exercising such as a jump rope that may relatively easily change the exercise intensity. However, in the case of a running machine exercise, it is relatively difficult to change the exercise intensity.

TABLE 2

|  | Jump rope | Hula hoop | Running machine | Stationary bicycle |
|---|---|---|---|---|
| Range of change rate | −46.8~54.7 rpm/s | −9.1~10.6 rpm/s | −3.1~1.4 kph/s | −47.7~70.3 rpm/s |

Unless balancing is performed, a player who selects a jump roping exercise may easily accelerate the game object and may easily switch a direction. However, a player who selects a running machine exercise may have difficulty in controlling a motion of the game object and lose interest in the exercise game.

If players who participate in a game through different exercises set the game object to be accelerated at the maximum speed of the game and to switch a direction when the players exercise at the maximum exercise intensity change rate that they may exhibit while exercising, it is possible to fairly accelerate the game object and switch the direction of the game object regardless of types of exercises.

Based on the empirical exercise intensity change rate of Table 2, when target acceleration $a_{tgt}$ of the game object is determined, and coefficient β corresponding to a ratio of the maximum exercise intensity change rate $a_{ex\_max}$ for each exercise type to the target acceleration $a_{tgt}$ is multiplied by the exercise intensity change rate $a_{ex}$ of the player, it is possible to obtain the balanced change rate $a_{obj}$.

The balanced change rate $a_{obj}$ may affect the speed of the game object based on Newton's laws of motion.

The target acceleration $a_{tgt}$ of the game object may consider the following three cases:

For example, if the target acceleration $a_{tgt}$ is determined as the maximum value of the maximum change rate values of Table 2, there may be no big difference in the case of exercise having an originally good change rate. However, in the case of exercise having an originally bad change rate, the game object may react too sensitively even to a small change in the exercise intensity.

For example, if the target acceleration $a_{tgt}$ is determined as the minimum value of the maximum change rate values of Table 2, the player may feel as if the game object does not react even to a great change in the exercise intensity in the case of exercise having an originally good change rate. In the case of exercise having an originally bad change rate, the player may feel as if the game object still reacts too slowly.

If the target acceleration $a_{tgt}$ is determined as the average value of the maximum change rate values of Table 2, the game object may more sensitively react to a small change in the exercise intensity in the case of exercise having an originally bad change rate. On the contrary, in the case of exercise having an originally good change rate, reaction of the game object may become slightly boring. Accordingly, levels of acceleration/deceleration of the game object or switching of the direction that players who exercise with different exercise intensity change rates feel may be balanced.

Step S33 is a step of balancing different times in which the player can continue exercising for each exercise type. In step S33, the excessive quantity of exercise is accumulated while the player is performing an exercise that needs the relatively large quantity of exercise. When the player selects a mode, balanced exercise intensity information for driving the game object may be provided temporarily during a period of time corresponding to the accumulated excessive quantity of exercise, instead of providing exercise intensity information of the player.

For example, if the player who exercises a lot activates a cruise control mode while decreasing the exercise intensity or taking a break when the large excessive quantity of exercise is accumulated, the accumulated excessive quantity of exercise is subtracted and the motion of the game object is continuously maintained while the cruise control mode is being maintained.

In the cruise control mode, the game object may be continuously driven based on exercise intensity information of when entering into the cruise control mode. Regardless of data of when entering into the cruise control mode, the game object may be driven based on predetermined exercise intensity information.

In the cruise control mode, the player may change exercise intensity information that the player desires to maintain at a cruise control speed according to the intent of the player. In this case, the game object may move at the cruise control speed more quickly or more slowly than before changing the exercise intensity information and the accumulated excessive quantity of exercise may be more quickly or more slowly consumed.

Specifically, the MET may be used as the measured quantity of exercise. Compared to exercise having the lowest MET for each exercise type, excessive METs (ΔMET) may be empirically obtained as shown in Table 3.

TABLE 3

|  | Jump rope | Hula hoop | Running machine | Stationary bicycle |
| --- | --- | --- | --- | --- |
| Speed | 129.4 rpm | 68.9 rpm | 9.1 kph | 68.6 rpm |
| MET | 9.96 | 5.87 | 9.55 | 6.62 |
| ΔMET | 4.09 | 0 | 3.68 | 0.75 |

According to Table 3, when exercising with the average exercise intensity between the minimum exercise intensity and the maximum exercise intensity, hula hooping exercise shows the lowest MET per hour and the jump roping exercise shows the highest MET per hour. Accordingly, when exercising for the same period of time, it may be highly probable that a player jump roping will most quickly get tired and not continue until the exercise game is terminated, and end the exercise game.

To prevent this, the exercise game of the present invention may accumulate the excessive quantity of exercise about exercise performed by the player, and may decrease the exercise intensity based on the accumulated excessive quantity of exercise, or may give an opportunity to recover the player's energy by taking a break, so that the player may not have a disadvantage in the exercise game.

For example, when a player performs a jump roping exercise, the exercise game may accumulate an exceeding MET value such as 4.09 per second. When the player getting tired of the jump roping exercise selects a cruise control mode to recover the player's strength by taking a break, the exercise game may subtract the exceeding MET value accumulated by then, while maintaining a speed value of the game object during the cruise control mode.

Step S34 is also a step of balancing different duration times for each exercise type, which is the same as step S33. In step S34, by temporarily decreasing the maximum exercise intensity $v_{ex\_vig}$ and thereby providing more advantageously balanced exercise intensity information, a player who performs an exercise that is disadvantageous in an aspect of a duration time is enabled to obtain a higher speed and acceleration of the game object even with the lower exercise intensity.

Through this, the balancing process of the multiplayer exercise game method according to exemplary embodiments of the present invention may balance between the different types of exercises with respect to the exercise intensity, the change rate, and the duration time.

Figure 4:
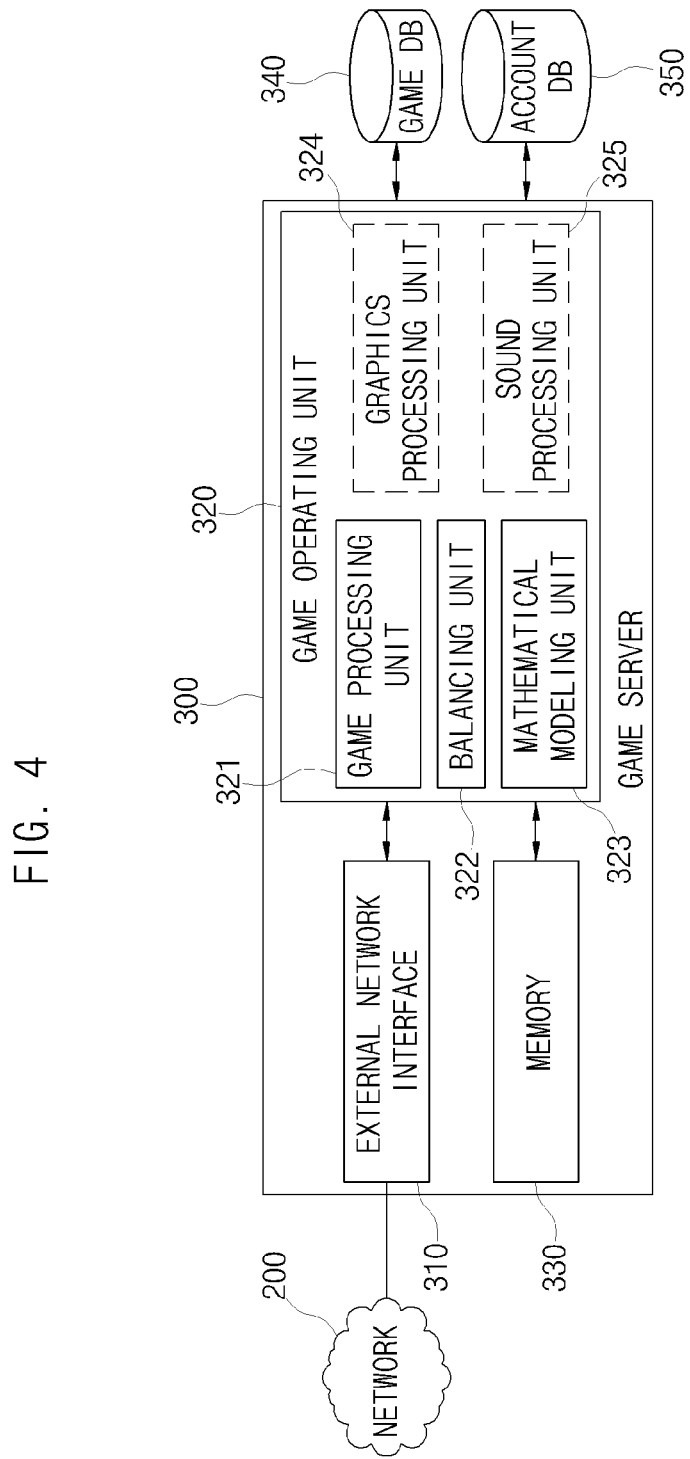
FIG. 4 is a block diagram illustrating an exemplary configuration of a game server of a multiplayer exercise game system according to an exemplary embodiment of the present invention.

FIG. 4 is a block diagram illustrating an exemplary configuration of a game server of a multiplayer exercise game system according to an exemplary embodiment of the present invention.

Referring to FIG. 4, the game server 300 may include a network interface 310, a game operating unit 320, a memory 330, a game database (DB) 340, and an account DB 350.

Exercise intensity information of each player that is transferred from each of game clients of a plurality of exercise equipment 100 over the network 200 is received via the network interface 310. Also, the network interface 310 outputs, to the game clients of the plurality of exercise equipment 100 over the network 200, game progress information that is generated by the game operating unit 320.

The game operating unit 320 may include a game processing unit 321, a balancing unit 322, and a mathematical modeling unit 323, and may selectively include a graphics processing unit 324 and a sound processing unit 325. The game operating unit 320 may be configured as exclusive hardware, and may also be configured as general-purpose hardware.

The game processing unit 321 is a game process that is executed by a game program code loaded to the memory 330. The game processing unit 321 inputs the received exercise intensity information to the balancing unit 322. As described above with reference to FIG. 3, the balancing unit 322 balances the exercise intensity information according to a balancing rule that is empirically determined for each of different exercise types with respect to the exercise intensity, the change rate, and the time duration, and applies the balanced exercise intensity information to the mathematical modeling unit 323.

The mathematical modeling unit 323 drives a mathematical model of the game object based on the input exercise intensity information to thereby determine a motion of the game object and to output the determined motion information of the game object to the game processing unit 321.

Next, the game processing unit 321 generates game progress information including motion information of the game object, and transmits the generated game progress information to the game client using the network interface 310 and the network 200.

Depending on exemplary embodiments, when screen rendering or sound generating is performed by the game server 300, the graphics processing unit 324 and the sound processing unit 325 may process the screen rendering and the sound generating, respectively. The game progress information may include rendered image data and generated sound data.

A game program code, mathematical model data, and game progress information may be stored in the memory 330. A program, a graphics source, a sound source, and the like relating to the game progress may be recorded in the game DB 340. Accounts of players are opened in the account DB 350. Personal information, details of game usage, and the like may be recorded in the account DB 350.

Also, the method according to the present invention may be implemented as a computer-readable code in computer-readable media. The computer-readable media includes any types of recording apparatuses storing data readable by a computing system. Examples of computer-readable media include read-only memory (ROM), random access memory (RAM), optical disks, magnetic tapes, floppy disks, hard disks, non-volatile memory, and the like, and also include forms of carrier wave (for example, transmission over the Internet). Also, a code that is distributed to a computer system connected to a network and thereby is computer-readable using a distributed scheme may be stored in computer-readable media and thereby be executed.

A multiplayer exercise game system according to exemplary embodiments of the present invention may remove boredom, which is a feeling that players who participate in a game may feel while exercising, through united interaction of the players.

In particular, even though a plurality of players perform different exercises using different types of exercise equipment, the multiplayer exercise game system of the present invention may balance the affect of exercise for each player while playing the exercise game, thereby minimizing advantages or disadvantages according to a characteristic of exercise or a difference of physical capability of each player, inducing players with different conditions to participate in the exercise game without losing interest, and enhancing the effect of exercise.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An exercise game system, comprising:
a plurality of game clients to transmit, over a network, exercise intensity information in which exercise intensities of a plurality of players performing various types of exercises are measured; and
a game server to drive an exercise game by receiving exercise intensity information of the respective players from the game clients over the network, and by determining a motion of a game object to be displayed on a game screen based on exercise intensity information that is balanced according to a predetermined balancing rule about at least one element of exercise intensity, a change rate, and a duration time according to different types of exercises,
wherein the game screen is represented to be capable of recognizing the motion of the game object that is affected by adjusting the intensity of exercise performed by the players,
wherein the game server operates to provide the balanced exercise intensity information by normalizing the exercise intensity information to the same scale using a difference between the minimum exercise intensity and the maximum exercise intensity that are empirically obtained according to the different types of exercises with respect to the balancing rule of the exercise intensity, and
wherein the balanced exercise intensity information is defined as $v_{obj} = \alpha \times (v_{ex} - v_{ex\_min})$,
where $v_{obj}$ denotes the balanced exercise intensity information, $v_{ex}$ denotes received current exercise intensity information, $\alpha$ is defined as $v_{obj\_max}/(v_{ex\_vig} - v_{ex\_min})$, $v_{obj\_max}$ denotes the maximum speed of the game object, $v_{ex\_vig}$ denotes the maximum exercise intensity of a corresponding exercise, and $v_{ex\_min}$ denotes the minimum exercise intensity.

2. The system of claim 1, wherein the game server operates to drive a mathematical model, pre-produced with respect to the game object, based on the balanced exercise intensity information, and to thereby determine the motion of the game object.

3. The system of claim 2, wherein the mathematical model is a model that is produced based on a physical characteristic of the game object to be capable of determining the motion of the game object.

4. The system of claim 1, wherein the various types of exercises include any one of exercise using at least one of a running machine, a rowing machine, a heath bicycle, a stepper, a swing stepper, a jump rope, and a hula hoop, stretching exercise in a state of wearing a tool capable of measuring a heart rate or a frequency, or weight training, and a combination thereof.

5. An exercise game system, comprising:
a plurality of game clients to transmit, over a network, exercise intensity information in which exercise intensities of a plurality of players performing various types of exercises are measured; and
a game server to drive an exercise game by receiving exercise intensity information of the respective players from the game clients over the network, and by determining a motion of a game object to be displayed on a game screen based on exercise intensity information that is balanced according to a predetermined balancing rule about at least one element of exercise intensity, a change rate, and a duration time according to different types of exercises,
wherein the game screen is represented to be capable of recognizing the motion of the game object that is affected by adjusting the intensity of exercise performed by the players,
wherein the game server operates to provide the balanced exercise intensity information by normalizing a temporal change rate of the exercise intensity information to the same scale using the maximum value, the minimum value, or the average value of exercise intensity change rates that are empirically obtained according to the different types of exercises with respect to the balancing rule of the change rate, and by reflecting a normalized change rate to the exercise intensity information, and
wherein the balanced exercise intensity change rate is defined as $a_{obj} = \beta \times a_{ex}$,
where $a_{obj}$ denotes the balanced exercise intensity change rate, $a_{ex}$ denotes a current exercise intensity change rate, $\beta$ is defined as $a_{tgt}/a_{ex\_max}$, $a_{tgt}$ denotes target acceleration of the game object, and $a_{ex\_max}$ denotes the maximum exercise intensity change rate of a corresponding exercise.

6. An exercise game system, comprising:
a plurality of game clients to transmit, over a network, exercise intensity information in which exercise intensities of a plurality of players performing various types of exercises are measured; and
a game server to drive an exercise game by receiving exercise intensity information of the respective players from the game clients over the network, and by determining a motion of a game object to be displayed on a game screen based on exercise intensity information that is balanced according to a predetermined balancing rule about at least one element of exercise intensity, a change rate, and a duration time according to different types of exercises,
wherein the game screen is represented to be capable of recognizing the motion of the game object that is affected by adjusting the intensity of exercise performed by the players,
wherein the game server operates to accumulate an excessive quantity of exercise according to the different types of exercises and to decrease the exercise intensity based on the accumulated excess quantity of exercise temporarily during a period of time,
wherein the excessive quantity of exercise is calculated by comparing the metabolic equivalents of task (MET) for an exercise with the smallest MET among METs that are empirically obtained with respect to the different types of exercises during exercise, and
wherein when a player having an accumulated the excessive quantity of exercise to be greater than or equal to a predetermined value selects a cruise control mode, the game server operates to provide at least one of exercise intensity information of when entering into the cruise control mode, predetermined exercise intensity information, and exercise intensity information designated by the player, instead of providing exercise intensity information in response to the player exercising.

7. The system of claim 5, wherein the game server operates to drive a mathematical model, pre-produced with respect to the game object, based on the balanced exercise intensity information, and to thereby determine the motion of the game object.

8. The system of claim 7, wherein the mathematical model is a model that is produced based on a physical characteristic of the game object to be capable of determining the motion of the game object.

9. The system of claim 5, wherein the various types of exercises include any one of exercise using at least one of a running machine, a rowing machine, a heath bicycle, a stepper, a swing stepper, a jump rope, and a hula hoop, stretching exercise in a state of wearing a tool capable of measuring a heart rate or a frequency, or weight training, and a combination thereof.

10. The system of claim 6, wherein the game server operates to drive a mathematical model, pre-produced with respect to the game object, based on the balanced exercise intensity information, and to thereby determine the motion of the game object.

11. The system of claim 10, wherein the mathematical model is a model that is produced based on a physical characteristic of the game object to be capable of determining the motion of the game object.

12. The system of claim 6, wherein the various types of exercises include any one of exercise using at least one of a running machine, a rowing machine, a heath bicycle, a stepper, a swing stepper, a jump rope, and a hula hoop, stretching exercise in a state of wearing a tool capable of measuring a heart rate or a frequency, or weight training, and a combination thereof.

* * * * *